United States Patent [19]
Doherty et al.

[11] Patent Number: 5,341,834
[45] Date of Patent: Aug. 30, 1994

[54] MULTIPORT VALVE FOR FLUID TRANSFER SYSTEMS

[75] Inventors: Kenneth W. Doherty, West Falmouth; Susumu Honjo, Falmouth; John D. Billings, North Falmouth, all of Mass.

[73] Assignee: McLane Research Laboratories, Inc., Monument Beach, Mass.

[21] Appl. No.: 122,384

[22] Filed: Sep. 16, 1993

[51] Int. Cl.$^5$ .................. B01D 27/10; F16K 11/074
[52] U.S. Cl. ...................... 137/599.1; 137/625.11; 137/601; 210/340
[58] Field of Search ............... 137/599.1, 601, 625.11, 137/625.28, 625.29; 210/340, 341

[56] References Cited

U.S. PATENT DOCUMENTS

| | | | |
|---|---|---|---|
| 2,681,736 | 6/1954 | Voorheis | 137/625.29 X |
| 2,757,541 | 8/1956 | Watson et al. | 137/625.29 X |
| 2,921,687 | 1/1960 | Jenkins | 137/599.1 X |
| 3,380,591 | 4/1968 | Muller | 210/333.1 X |
| 3,530,989 | 9/1970 | Koethke | 210/340 X |
| 3,703,465 | 11/1972 | Reece et al. | 210/333.1 X |
| 4,112,975 | 9/1978 | Csanady, Jr. | 137/625.29 |
| 4,286,624 | 9/1981 | Clausen et al. | 137/625.29 X |
| 4,430,220 | 2/1984 | Litzenburger | 210/340 X |
| 4,501,295 | 2/1985 | Williams et al. | 137/625.29 X |
| 4,827,979 | 5/1989 | Boddy | 137/625.29 |
| 4,923,068 | 5/1990 | Crowson | 210/340 X |
| 5,167,802 | 12/1992 | Sandstrom et al. | 137/625.11 |

*Primary Examiner*—John Rivell
*Attorney, Agent, or Firm*—Daniel H. Kane

[57] ABSTRACT

A multiport valve for a water transfer system passes water, drawn by a pump, through a plurality of collectors. A programmable controller controls operation of the pump and a stepper motor which positions the multiport valve in a time series sequence according to user instructions. The multiport valve is formed with a first valve head having an intake port and multiple separate outlet ports. The respective outlet ports are connected to the respective collectors at respective collector inlets. A first rotor bears against the first valve head and forms a seal between the first rotor and first valve head. The first rotor is formed with a first coupling channel for coupling the intake port of the first valve head to different outlet ports according to the rotational position of the first rotor. The multiport valve incorporates a second valve head formed with an exhaust port and a plurality of separate inlet ports coupled to the respective plurality of collectors at respective collector outlets. A second rotor bears against the second valve head substantially forming a seal between the second rotor and second valve head. The second rotor is formed with a second coupling channel for coupling the exhaust port to different inlet ports according to the rotational position of the second rotor for exhausting water.

20 Claims, 5 Drawing Sheets

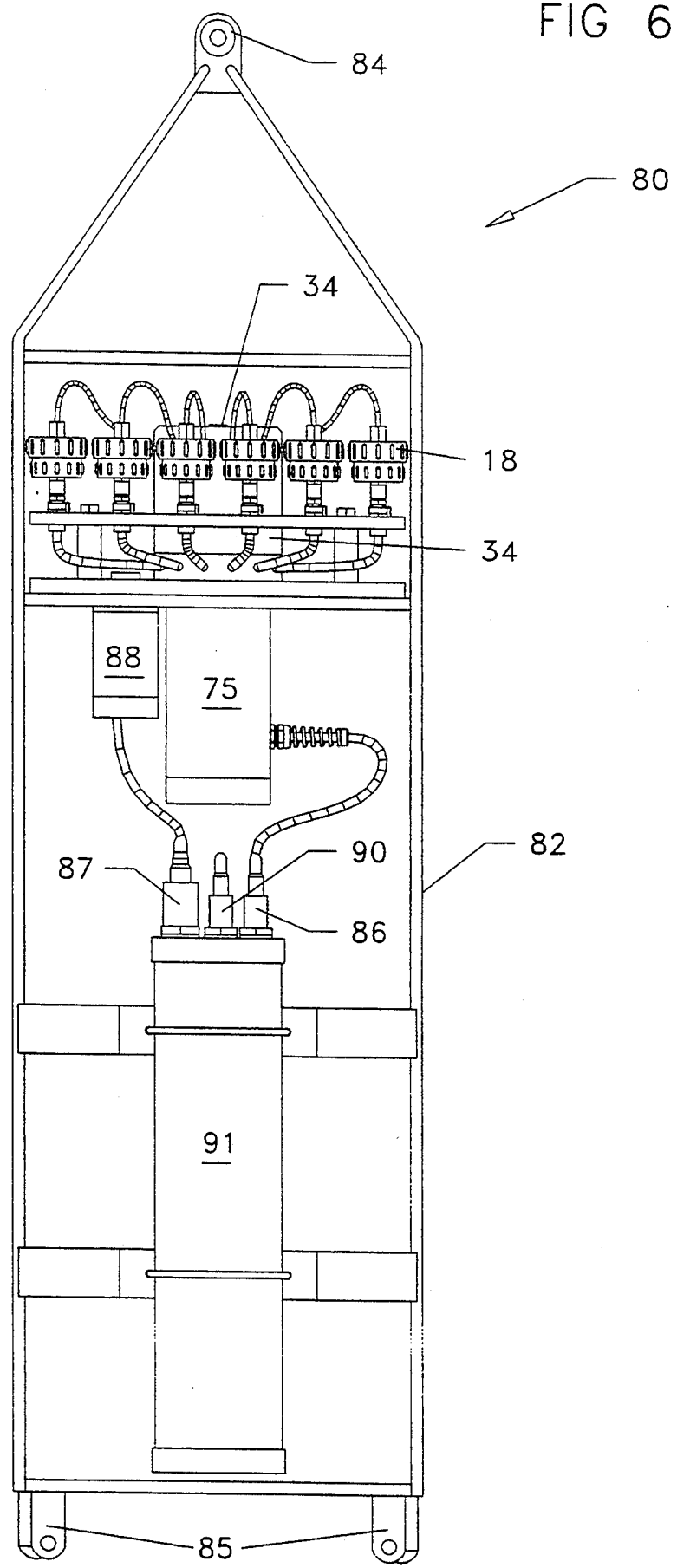

MULTIPORT VALVE FOR FLUID TRANSFER SYSTEMS

TECHNICAL FIELD

The present invention relates to a new multiport valve useful for delivering water or other fluid to multiple separate sampling sites. The multiport valve of the present invention is incorporated in a water transfer system or other fluid transfer system for sampling the fluid at the respective sampling sites in a time series sequence. For example, the sampling sites may contain filters or column collectors for sampling and collecting suspended particles or selected molecules for testing. The new multiport valve controls transfer of fluid through the selected sampling sites in the desired time series sequence while sealing and preventing leakage from the other sampling sites.

BACKGROUND ART

Water transfer systems (WTS) have been developed to pass sea water or other fluid to be studied through multiple user replaceable sample collectors in a time series sequence. By way of example filters are used for sampling, collecting and studying suspended particles and various collector columns are used for sampling, collecting and testing selected molecules. The water transfer system includes a pump which draws the sea water or other fluid to be studied successively through the multiple collector sites. A multiport valve opens and closes the channels to the respective sampling sites. A programmable controller relays instructions programmed by a user for controlling the pump and multiport valve.

The WTS can be programmed by the user for collecting suspended particles or concentrating specified molecules in filters and column collectors in a desired time series sequence. For example, the user can specify the time, date, and interval duration for sample collection at each successive sampling site. The user can also specify the pumping rate, flow rate of water, and total quantity of water pumped through each successive sampling site.

Alternatively the WTS programmable controller can be preprogrammed with a back pressure threshold for example for use with multiple filters or collectors. As particles build up in the filter, the controller senses slow down in the speed of the drive motor that drives the pump which is in turn responsive to back pressure. The controller can be programmed to turn off the pump at the selected back pressure threshold. The next sampling occurs at a new filter location sampling site at the preprogrammed time. A stepper motor under control of the programmable controller steps the multiport valve head for directing water flow through the next filter. The controller also records all of the relevant parameters associated with each sampling event.

An example of such a water transfer system is the McLane Research Laboratories, Inc. McLane WTS Mark 5-18 water transfer system further described in the *USER'S MANUAL WATER TRANSFER SYSTEM MCLANE WTS MARK* 5-18, "Manual Version 1.43", August, 1992, by McLane Research Laboratories, Inc., 171 Clay Pond Road, Monument Beach, Mass. 02553.

A simplified diagrammatic view of an existing WTS 10 is illustrated in FIG. 1. A precision gear pump 12 with inert graphite gears is positioned on the downstream side of WTS 10 for drawing water through the WTS to avoid contamination of the sampling sites. The precision pump 12 is driven by, for example, a brushless DC servomotor whose speed is controlled by the programmable controller.

On the upstream side of the WTS 10 is the multiport valve assembly shown diagrammatically in block 14. The multiport valve 14 has a single valve head 14a with an intake port 15 through which the water or other fluid to be studied is drawn by pump 12, and multiple outlet ports 16 only one of which is open at a time by the multiport valve 14. The multiport valve assembly is coupled to a bank 18 of multiple filter holders containing respective multiple filters 20, in this example 24 in number. The respective outlet ports 16 of the multiport valve head 14a are coupled one on one to the respective filters 20 at the inlet side of the filter holders of bank 18. The outlet lines from the respective filters 20 of the bank of filter holders 18 pass through respective one way check valves 22, through a common manifold 24, and through exhaust port and manifold line 25 to the pump 12.

As subsequently described the multiport valve head 14a is typically a rotating single head valve which directs the water flow from the single intake port 15 through one of the outlet ports 16 and one of the filters 20 in the filter holder bank 18 as part of the time series sequential filter collection. A sensor such as a Hall sensor at the WTS pump drive motor, not shown, senses the pumping rate of the motor which is in turn responsive to back pressure. According to one mode of operation a programmed back pressure threshold indicates when the current filter is substantially saturated with collected suspended particles. A stepper motor coupled to the multiport valve 14 is actuated to rotate the single valve head and pass the intake water through the next filter at the programmed time. In this way the self contained WTS can be left unattended at a marine location or other water location for an extended period of time to provide the time series spectrum of sampled particles or other samples of interest.

A disadvantage of the WTS 10 of FIG. 1 is that the water flow through all of the filters 20 in the bank of filter holders 18 combines in the common manifold 24. Water flow may continue to leak through spent filters. Collected suspended particle filtrate in the spent filters may be lost by leakage into the common manifold 24. As a result the integrity of the time series spectrum of collected particles or other target samples for study may be compromised.

OBJECTS OF THE INVENTION

It is therefore an object of the present invention to provide a new multiport valve for water transfer systems and more generally fluid transfer systems which can be controlled to provide a time series spectrum of samples for analysis while at the same time maintaining the integrity of the collected samples throughout the sampling time.

Another object of the invention is to provide a new multiport valve for time series sampling in multiple filters or multiple collector columns in which the multiport valve seals the sampling inlets and outlets on both sides of a particular filter or collector column before and after sampling use.

A further object of the invention is to provide a multiport valve with dual valve heads for bracketing both sides of a bank of filter holders or collector column holders with controlled opening and closing of both the sampling inlet and sampling outlet sides. A feature of the invention is that the dual heads of the multiport valve are operated in synchronism under control of the WTS programmable controller and form sealing closures on both sides of spent filters or collectors.

DISCLOSURE OF THE INVENTION

In order to accomplish these results the invention provides a multiport valve for delivering water or other fluid to a plurality of separate fluid sampling sites having respective fluid sampling inlets and outlets. A first multiport valve head is formed with a fluid intake port and multiple different outlet ports coupled respectively to the fluid sampling inlets. A valve head first distributor couples the fluid intake port to different successive outlet ports for delivering fluid to selected fluid sampling sites at selected fluid sampling inlets. The first distributor substantially seals the other fluid sampling inlets.

According to the invention a second multiport valve head is provided with a fluid exhaust port and multiple separate fluid inlet ports coupled respectively to the fluid sampling outlets. A valve head second distributor couples the exhaust port to different successive inlet ports for exhausting fluid from selected fluid sampling sites at selected fluid sampling outlets. A feature of the invention is that the second distributor substantially seals the other fluid outlets to minimize leakage from the other fluid sampling sites.

A motor such as a stepper motor coordinates the first and second distributors for delivering fluid to and exhausting fluid from the respective fluid sampling sites in a time series sequence. The stepper motor may be controlled by a programmable controller according to user programmed instructions.

In the preferred example embodiment, the valve head first distributor is a first rotor which bears against the first valve head and substantially forms a seal between the first rotor and first valve head. The first rotor is formed with a first coupling channel for coupling the intake port to different outlet ports according to the rotational position of the first rotor. The valve head second distributor is a second rotor which similarly bears against the second valve head and substantially forms a seal between the second rotor and second valve head. The second rotor is formed with a second coupling channel for coupling the exhaust port to different inlet ports according to the rotational position of the second rotor.

According to the preferred example, the first valve head is formed with an elongate inlet channel coupled to the intake port. The first coupling channel of the first rotor couples the elongate inlet channel to different outlet ports according to the rotational position of the rotor. Similarly the second valve head is formed with an elongate outlet channel coupled to the exhaust port. The second coupling channel of the second rotor couples the elongate outlet channel to different inlet ports according to the rotational position of the second rotor.

The first valve head and first rotor are formed with flat bearing faces bearing against each other. The first coupling channel is a groove formed in the bearing face of the first rotor and the elongate inlet channel is a circular groove formed in the bearing face of the first valve head. Similarly the second valve head and second rotor are formed with flat bearing faces bearing against each other. The second coupling channel is a groove formed in the bearing face of the second rotor and the elongate outlet channel is a circular groove formed in the bearing face of the second valve head.

According to the invention the elongate outlet channel on the bearing face of the second multiport valve head forms an inner circle and the multiple inlet ports terminate in holes arranged in an outer circle concentric with and outside the inner circle. The second coupling channel on the bearing face of the second rotor is a radial groove extending between the inner and outer circles.

Preferably the first and second valve heads are formed of a first material and the first and second rotors are formed of a second material softer than the first material. The different hardnesses provide a good seal between the flat bearing surfaces of the respective valve heads and respective rotors. In the preferred construction the first valve head, first rotor, second rotor, second valve head, and stepper motor are mounted in sequence on a common shaft for rotation of the rotors relative to the valve heads. A high tension spring is coupled between the first and second rotors for spring biasing the rotors against the respective first and second valve heads.

The invention is applicable to a variety of water transfer systems and other fluid transfer systems for testing, collecting, and sampling generally at multiple sampling sites. The sampling sites may be constructed with filters, collector columns, detectors, sample tubes for holding fluid samples, and generally any sample collecting or testing device. The multiport valve is therefore adaptable to a variety of applications. Other objects, features and advantages of the invention are apparent in the following specification and accompanying drawings.

BRIEF DESCRIPTION OF THE DRAWINGS

FIG. 4 is a partial cross section in the direction of the arrows on line B—B of FIG. 3.

FIG. 6 is a side view of a water transfer system incorporating the multiport valve.

DESCRIPTION OF PREFERRED EXAMPLE EMBODIMENTS AND BEST MODE OF THE INVENTION

Figure 2:
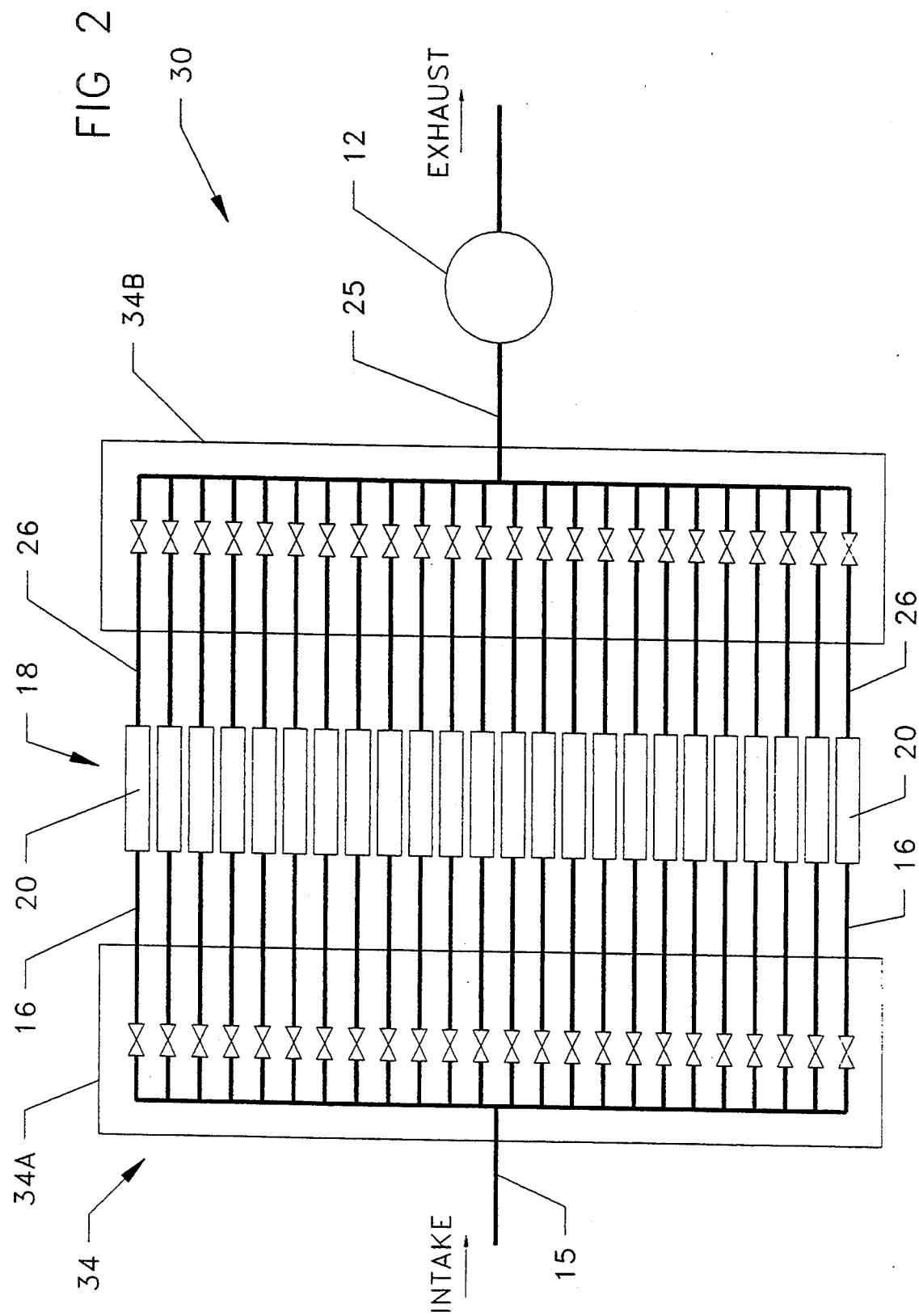
FIG. 2 is a simplified diagrammatic view of a water transfer system incorporating a double head multiport valve constructed according to the invention.

The simplified elements of a multiport valve and water transfer system 30 according to the present invention are illustrated in FIG. 2. The precision gear pump 12 is also downstream from the other components of the water transfer system 30 to avoid contamination of the water or other fluid to be tested. At the upstream side a multiport valve 34 is provided with first and second multiport valve heads 34a,34b. The first valve head 34a receives the water or other fluid to be studied drawn into a single intake port 15. The valve head 34a incorporates multiple output ports 16 which in this example are 24 in number. Only one port is opened at a time by the multiport valve 34. The outlet ports 16 and corresponding output lines are coupled to the respective inlets of the sampling sites 20 in this case a bank 18 of filter holders containing the separate filters 20. Intake water at the intake port 15 therefore passes through only one of the filters 20 at a time according to which of the outlet ports 16 is open to the intake port 15.

The programmable controller not shown in FIG. 2 provides user defined control over the multiport valve 34 and pump 12 for passing the intake water through the respective filters 20 in a defined time series sequence. The user through appropriate program steps can define the starting time and duration of each sampling event through each of the respective filters 20, the pump rate and rate of flow of the water to be sampled, as well as the total quantity of water to be sampled through a particular filter 20. The user can also set a programmable back pressure threshold for indicating saturation of a particular filter 20. By way of example, this is accomplished using one of the brushless DC motor's Hall effect sensors to measure the speed of the pump 12. The rate of the motor is responsive to the back pressure to provide an indication at a selected threshold value that a particular filter is spent.

Figure 1:
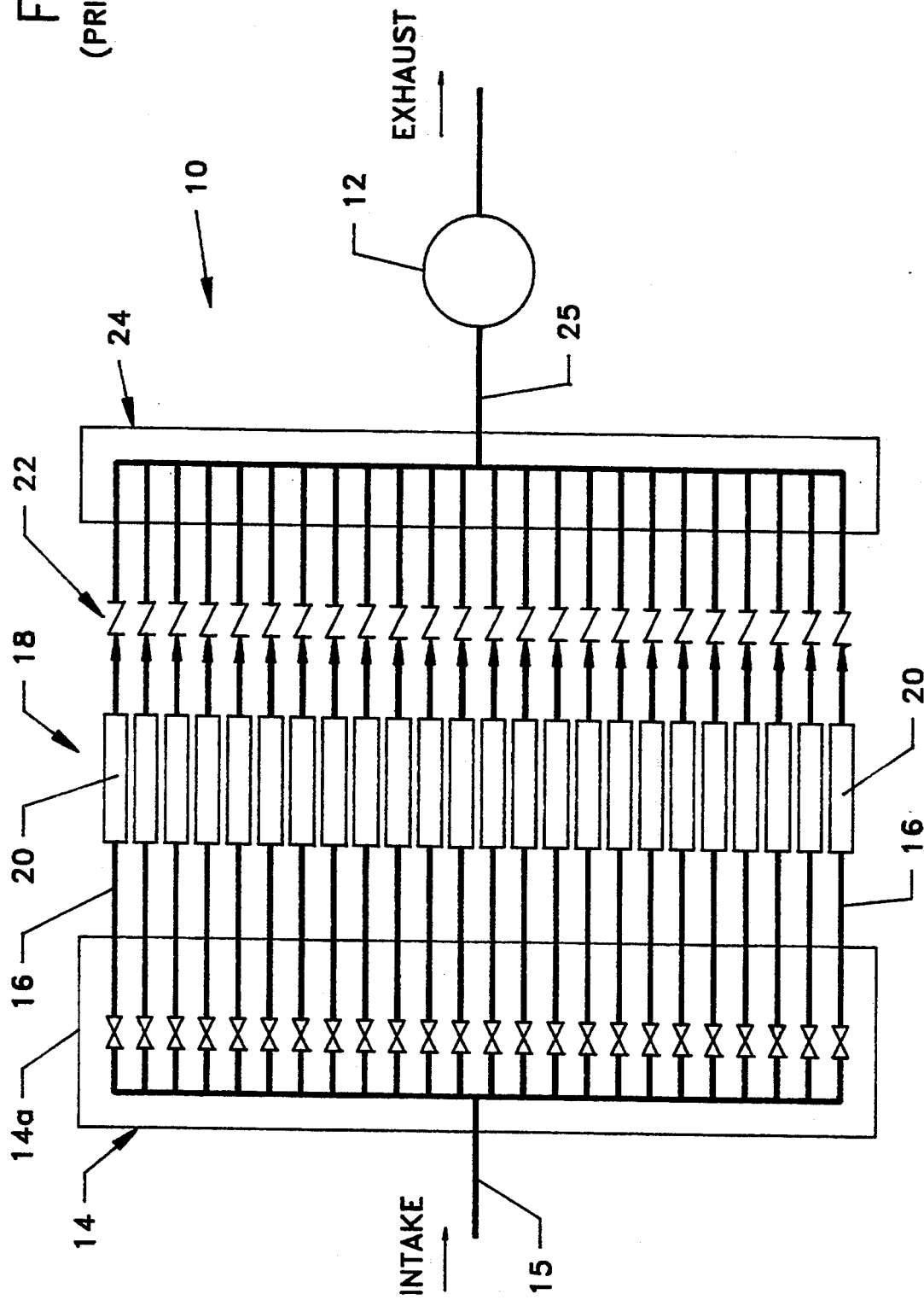
FIG. 1 is a simplified diagrammatic view of an existing water transfer system with a single head multiport valve.

Unlike the existing conventional multiport valve and water transfer system 10 of FIG. 1, the multiport valve 34 incorporates a second multiport valve head 34b on the downstream side of the bank 18 of sampling sites i.e. the filter holders for filters 20. The second valve head 34b is formed with multiple inlet ports 26 leading through the valve head 34b to single exhaust port 25. Only one of the inlet ports 26 is open at a time through the second valve head 34b to the exhaust port 25. As hereafter described the valve heads 34a and 34b are constructed to seal off the respective outlet ports 16 and inlet ports 26 that are not in current use. The multiport valves are coordinated by a stepper motor 38 as hereafter described for opening corresponding outlet ports 16 and inlet ports 26 through the selected sampling sites at respective sampling inputs and outputs of bank 18 in a time series sequence.

The dual valve head multiport valve 34 can therefore control the development of a spectrum of samples in a time series sequence while sealing off the respective outlet ports 16 and inlet ports 26 for maintaining the integrity of already collected samples. The dual multiport valve heads 34a and 34b of the multiport valve 34 effectively bracket the multiple sampling sites sealing both sides at the sampling inlets and outlets except at the current locus of sampling.

Figure 3:
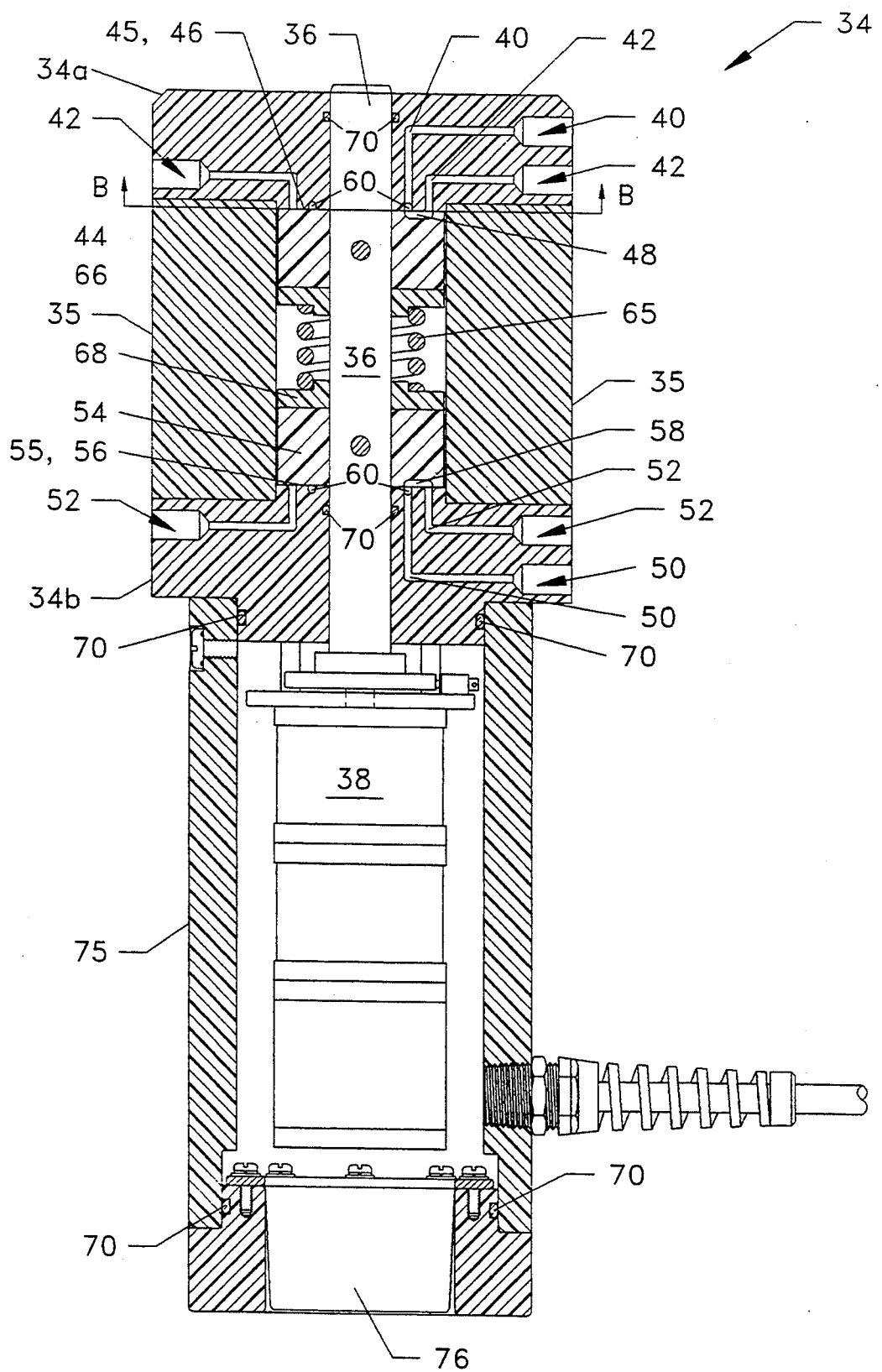
FIG. 3 is a partial side cross sectional view through a multiport valve with dual valve heads according to the present invention. The stepper motor and shaft are not shown in cross section.

A physical implementation of the multiport valve 34 with dual valve heads 34a and 34b for bracketing the bank sampling locations 18 is illustrated in FIG. 3. As shown in FIG. 3, the multiport valve 34 is constructed with first and second valve heads 34a and 34b. The dual valve heads 34a and 34b along with the multiport valve body 35 remain in stationary position relative to a water transfer system and a central coaxial rotating drive shaft 36 driven by stepper motor 38.

The first multiport valve head 34a is formed with a fluid intake port 40 and multiple different outlet ports 42, in this example 24 in number corresponding to twenty-four sampling sites such as twenty-four filters in a bank of twenty-four filter holders. Thus, the twenty-four outlet ports 42 are coupled respectively to the twenty-four sampling inlets of twenty-four sampling locations. The single intake port 40 is coupled to a selected outlet port 42 by what is effectively a fluid distributor 44 tied to the rotating shaft 36. The rotor 44 bears against the first valve head 34a at common bearing surfaces 45,46. The first rotor 44 is formed with a coupling channel 48 which makes the connection between the intake port 40 and a selected outlet port 42 as hereafter described.

The second valve head 34b of the multiport valve 34 is formed with a single exhaust port 50 and multiple separate fluid inlet ports 52 also twenty-four in number according to this example. The inlet ports 52 are coupled respectively to the twenty-four sampling outlets of the twenty-four sampling sites, for example twenty-four filters in a bank 18 of twenty-four filter holders. A second fluid distributor 54 bears against the second valve head 34b at the common bearing surfaces 55,56. The second rotor 54 is formed with a second coupling channel 58 which makes the connection between the single exhaust port 50 and a selected inlet port 52 coupled to the sampling outlet of one of the sampling locations.

Figure 4:
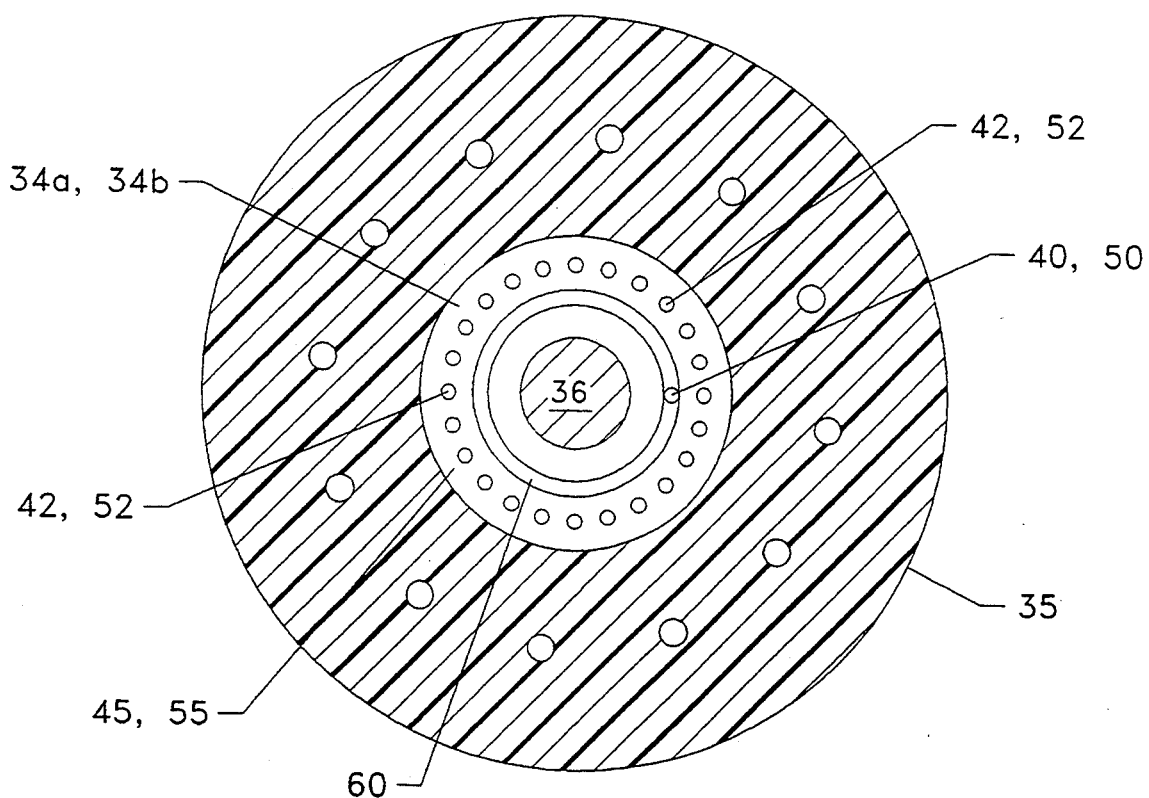
FIG. 4 is a partial cross sectional view at the interface between bearing surfaces of a multiport valve head and rotor showing a plan view of the flat bearing face of the multiport valve head. Specifically.
Figure 5:
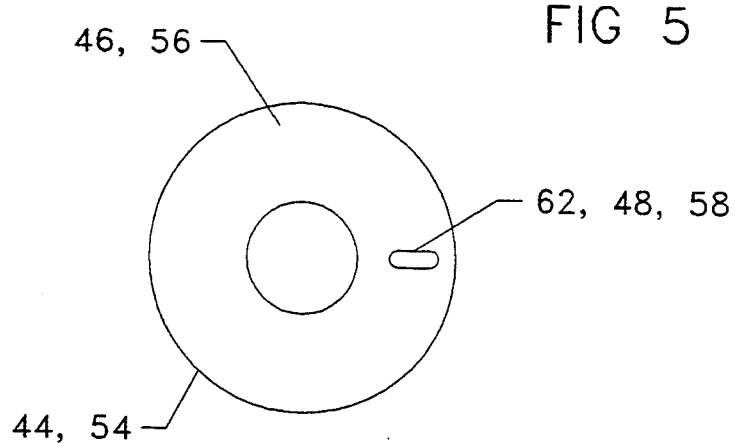
FIG. 5 is a plan view of the flat bearing face of the rotor.

To understand the operation of the dual valve head, dual distributor, multiport valve 34 of FIG. 3, reference is made to FIG. 4 and FIG. 5. FIG. 4 is a cross section through the top of the multiport valve 34 in the direction of the arrows on line B—B of FIG. 3. FIG. 4 therefore illustrates the respective flat bearing surfaces 45,55 of the first and second multiport valve heads 34a and 34b which are generally identical. As shown in FIG. 4, the single intake port and intake line 40,50 is coupled to an elongate inlet channel 60 in the configuration of a circular groove 60 concentric with the driven rotating shaft 36. The twenty-four outlet ports and outlet lines 42,52 terminate in a ring of twenty-four holes forming an outer ring 42,52 concentric with and outside the inner ring 60.

FIG. 5 on the other hand illustrates the respective flat bearing surfaces 46,56 of the first and second rotors or distributors 44,54 which are secured to the rotating shaft 36. Bearing surfaces 46,56 are also substantially the same. Thus, the fluid distributors 44,54 rotate with shaft 36 while the dual valve heads 34a,34b and valve body 35 remain stationary relative to the rotating shaft 36 and rotors 44,54. The bearing face 46,56 of both rotors 44, and 54 are formed with a coupling channel 48,58 in the form of a radial groove 62 having dimensions and radial position for extending a coupling channel between the inner ring 60 and outer ring 42,52 on the bearing face 45,55 of the respective dual valve heads, 34a,34b. Thus, the radial groove coupling channel 62 is positioned for making selected couplings in a time series sequence between the elongate channel 60 and selected ports of the outer circle 42,52 in the controlled sequence determined by instructions from a programmable controller.

In the case of the first valve head 34a, the coupling channel radial groove 62 makes selective couplings between the elongate inlet channel 60 and selected outlet ports 42 leading to respective sampling inlets at the respective sampling locations. In the case of the second valve head 34b, the coupling channel radial groove 62 makes selective couplings between the elongate outlet channel 60 and selected inlet ports 52 coupled respectively to the sampling outlets at the sampling locations.

With respect to construction features of the multiport valve 34 of FIGS. 3–5, the first and second multiport valve heads 34a,34b and valve body 35 can be constructed for example from relatively hard Delrin (TM) plastic. On the other hand the rotors or distributors 44,54 are constructed for example of softer Teflon (TM) plastic. The relatively softer and relatively harder flat bearing surfaces 46,45 and 56,55 respectively provide a good seal between the bearing surfaces sealing off the unused outlet ports 42 of the first valve head 34a and sealing off the unused inlet ports 52 of the second valve head 34b. Instead of plastic, other materials may be used for the valve heads 34a,34b and rotor distributors 44,54 such as ceramic and graphite materials. More important than the particular materials and relative hardnesses, however, the bearing surfaces are formed with flat faces to achieve the desired sealing engagement. This sealing relationship between the flat bearing surfaces effectively prevents leakage from the spent filters or other collected samples at the sampling locations.

In order to maintain appropriate pressure between the bearing surfaces 46,45 and 56,55, the distributor rotors 44,54 are mounted on shaft 36 between the valve heads 34a and 34b. Compression Inconel X760 (TM) alloy spring 65 is mounted around the shaft 36, bearing against the rotors 44,54 on spring bearing plates 66 and 68. The spring 65 is selected for example to have a one hundred pound spring force assuring a sealing coupling between the bearing surfaces. Various seals throughout the multiport valve are assured by the use of O ring seals 70 at various locations.

With respect to further details of construction, the stepper motor 38 is housed within an oil filled cavity defined by stepper motor housing 75 also constructed from Delrin (TM) plastic material. The oil filled cavity is also partly defined by an oil bladder or oil diaphragm 76 which is sealed to the external water or other fluid. The diaphragm 76 and oil filled cavity provide pressure compensation for the housing 75 for pressure fluctuations to ocean depths, for example, up to 5000 meters. The rotary drive shaft 36 from stepper motor 38 is constructed for example from titanium metal.

By way of example the multiport valve of FIG. 3 is incorporated in a water transfer system 80 for time series sequential sampling of sea water at ocean depths up to 5000 meters as illustrated in FIG. 6. The water transfer system 80 is assembled on a mooring frame 82 with upper and low mooring eyes 84 and 85. The programmable controller 91 is contained for example in a titanium pressure housing and includes a stepper motor connector 86 for controlling the multiport valve 34, a pump motor connector 87 for controlling the pump 88, and a communication connector 90 where a personal computer is coupled for programming the controller 85 and downloading data from a sample collection time series sequence. The bank 18 of filter holders is shown conveniently mounted around the multiport valve 34 with the filter holders arranged in an outer circle for convenient coupling between the respective outlet ports of the first multiport valve head 34a and sampling inlets of the bank 18 of filter holders, and between the multiple outlet ports of the second multiport valve head 34b and the sampling outlets of the bank 18 of filter holders.

The multiport dual head valve 34 may be used for a variety of sampling applications at multiple sampling sites in addition to filtering. For example, the sampling sites may be fitted with collector columns for sampling selected molecules from the fluid, or with imperforate collecting tubes for collecting fluid samples to be analyzed in the lab or other location. Furthermore, while example materials have been described for construction of the multiport dual head valve components, other appropriate materials may also be used.

While the invention has been described with reference to particular example embodiments it is intended to cover all modifications and equivalents within the scope of the following claims.

We claim:

1. A multiport valve for delivering fluid to a plurality of separate fluid sampling sites having respective fluid sampling inlets and outlets comprising:

a first multiport valve head having a fluid intake port, a plurality of at least three different outlet ports coupled respectively to fluid sampling inlets of the fluid sampling sites, said outlet ports being arranged in a generally circular configuration, and a valve head first distributor bearing against the first multiport valve head for coupling the fluid intake port to different successive outlet ports for delivering fluid to selected fluid sampling sites at selected fluid sampling inlets, said first distributor substantially sealing the other fluid sampling inlets;

a second multiport valve head having a fluid exhaust port, a plurality of at least three separate fluid inlet ports coupled respectively to fluid sampling outlets from the fluid sampling sites, said inlet ports being arranged in a generally circular configuration, and a valve head second distributor bearing against the second multiport valve head for coupling the exhaust port to different successive inlet ports for exhausting fluid from selected fluid sampling sites at selected fluid sampling outlets, said second distributor substantially sealing the other fluid outlets to minimize leakage from the other fluid sampling sites;

and motor means coordinating the first and second distributors for delivering fluid to and exhausting fluid from the respective fluid sampling sites in a time series sequence.

2. The multiport valve of claim 1 wherein the valve head first distributor comprises a first rotor bearing against the first valve head and substantially forming a seal between the first rotor and first valve head, said first rotor being formed with a first coupling channel for coupling the intake port to different outlet ports according to the rotational position of the first rotor;

and wherein the valve head second distributor comprises a second rotor bearing against the second valve head and substantially forming a seal between the second rotor and second valve head, said second rotor being formed with a second coupling channel for coupling the exhaust port to different inlet ports according to the rotational position of the second rotor.

3. The multiport valve of claim 2 wherein the first valve head comprises an elongate inlet channel coupled to the intake port and wherein the first coupling channel of the first rotor couples said elongate inlet channel to different outlet ports according to the rotational position of the rotor;

and wherein the second valve head comprises an elongate outlet channel coupled to the exhaust port and wherein the second coupling channel of the second rotor couples said elongate outlet channel to different inlet ports according to the rotational position of the second rotor.

4. The multiport valve of claim 3 wherein the first valve head and first rotor are formed with flat bearing faces bearing against each other in a sealing relationship, and wherein the first coupling channel is a groove formed in the bearing face of the first rotor, and the elongate inlet channel is a circular groove formed in the bearing face of the first valve head;

and wherein the second valve head and second rotor are formed with flat bearing faces bearing against each other in a sealing relationship and wherein the second coupling channel is a groove formed in the bearing face of the second rotor, and the elongate outlet channel is a circular groove formed in the bearing face of the second valve head.

5. The multiport valve of claim 4 wherein the elongate outlet channel on the flat bearing face of the second multiport valve head forms an inner circle and the multiple inlet ports terminate in holes arranged in an outer circle concentric with and outside the inner circle, and wherein the second coupling channel on the flat bearing face of the second rotor is a radial groove extending between said inner and outer circles.

6. The multiport valve of claim 5 wherein the first and second valve heads are formed of a first material, and the first and second rotors are formed of a second material softer than the first material for providing a good seal between the respective valve heads and respective rotors.

7. The multiport valve of claim 1 wherein the motor means is a stepper motor, and a programmable controller is coupled to the stepper motor and provides instructions for delivering fluid to successive fluid sampling sites in a time series sequence.

8. The improved multiport valve of claim 2 wherein the first valve head, first rotor, second rotor, second valve head, and motor are mounted in sequence on a common shaft for rotation of the rotors relative to the valve heads, and further comprising a high tension spring coupled between the first and second rotors for spring biasing said rotors against the respective first and second valve heads.

9. The multiport valve of claim 6 comprising a pump coupled to the exhaust port of the second multiport valve head for drawing fluid through the first valve head, a selected fluid sampling site, and the second valve head, and wherein the fluid sampling sites comprise filters.

10. The multiport valve of claim 1 wherein the plurality of sampling sites comprise filters.

11. The multiport valve of claim 1 wherein the plurality of sampling sites comprise collector columns.

12. The multiport valve of claim 1 wherein the plurality of sampling sites comprise sample tubes for collecting and holding fluid samples.

13. An improved multiport valve for a water transfer system for passing water or other fluid through a plurality of collectors in a time series sequence for testing or sampling, said water transfer system including a pump for drawing fluid through the successive collectors at respective collector inlets and outlets, said multiport valve controlling fluid channels to the respective collectors, and a programmable controller for receiving user instructions and for controlling operation of the pump and multiport valve, the improvement comprising:

said multiport valve comprising a first valve head formed with an inlet port coupled to an elongate inlet channel for receiving fluid to be tested or sampled, and a plurality of separate outlet ports, said respective outlet ports being coupled to the respective collectors at respective collector inlets;

a first rotor bearing against the first valve head and substantially forming a seal between the first rotor and first valve head, said first rotor being formed with a first coupling channel for coupling the elongate inlet channel of the first valve head to different outlet ports according to the rotational position of the first rotor and for delivering intake fluid to respective collectors at respective collector inlets;

said multiport valve comprising a second valve head formed with an exhaust port coupled to an elongate outlet channel, and a plurality of separate inlet ports coupled to the respective plurality of collectors at respective collector outlets;

a second rotor bearing against the second valve head and substantially forming a seal between the second rotor and second valve head, said second rotor being formed with a second coupling channel for coupling the elongate outlet channel to different inlet ports according to the rotational position of the second rotor for exhausting outlet fluid from selected collectors at collector outlets, said second valve head and second rotor substantially sealing the other collector outlets to minimize leakage from other collectors;

and a motor coupled to the first and second rotors for turning the rotors to different rotational positions, said motor and rotors being constructed to coordinate the rotational positions of said rotors for passing fluid through the respective collectors in a time series sequence according to instructions from the programmable controller.

14. The improved multiport valve of claim 13 wherein the first valve head, first rotor, second rotor, second valve head, and motor are mounted in sequence on a common shaft for rotation of the rotors relative to the valve heads, and further comprising a high tension spring coupled between the first and second rotors for spring biasing said rotors against the respective first and second valve heads.

15. The multiport valve of claim 13 wherein the first and second valve heads are formed of a first material, and the first and second rotors are formed of a second material softer than the first for providing a good seal between the respective valve heads and respective rotors.

16. The multiport valve of claim 13 wherein the plurality of collectors comprise filters.

17. The multiport valve of claim 13 wherein the plurality of collectors comprise collector columns.

18. The multiport valve of claim 13 wherein the plurality of collectors comprise tubes for collecting and holding fluid samples for subsequent analysis.

19. The multiport valve of claim 13 wherein the first valve head and first rotor are formed with flat bearing faces bearing against each other in a sealing relationship, and wherein the first coupling channel is a groove formed in the bearing face of the first rotor, and the elongate inlet channel is a circular groove formed in the bearing face of the first valve head;

and wherein the second valve head and second rotor are formed with flat bearing faces bearing against each other in a sealing relationship and wherein the second coupling channel is a groove formed in the bearing face of the second rotor, and the elongate outlet channel is a circular groove formed in the bearing face of the second valve head.

20. The multiport valve of claim 19 wherein the elongate outlet channel on the flat bearing face of the second multiport valve head forms an inner circle and the multiple inlet ports terminate in holes arranged in an outer circle concentric with and outside the inner circle, and wherein the second coupling channel on the flat bearing face of the second rotor is a radial groove extending between said inner and outer circles.

* * * * *